United States Patent
Crecelius et al.

(10) Patent No.: US 6,396,161 B1
(45) Date of Patent: May 28, 2002

(54) INTEGRATED STARTER ALTERNATOR TROLLER

(75) Inventors: David R. Crecelius, Noblesville; David A. Fulton, Anderson, both of IN (US)

(73) Assignee: Delco Remy America, Inc., Anderson, IN (US)

( * ) Notice: Subject to any disclaimer, the term of this patent is extended or adjusted under 35 U.S.C. 154(b) by 0 days.

(21) Appl. No.: 09/551,395

(22) Filed: Apr. 17, 2000

(51) Int. Cl.[7] .................................................. F02N 11/00
(52) U.S. Cl. ............................................. 290/36 R; 322/1
(58) Field of Search ................................. 290/1 R, 1 A, 290/31, 36 R, 40 C; 322/1; 318/376

(56) References Cited

U.S. PATENT DOCUMENTS

| | | | |
|---|---|---|---|
| 2,504,833 A | 4/1950 | Hann | 115/17 |
| 3,175,095 A | 3/1965 | Denniston | 290/38 |
| 3,411,031 A * | 11/1968 | Voglesang | 290/4 |
| 3,619,632 A * | 11/1971 | Labombarde | 290/43 |
| 3,703,642 A * | 11/1972 | Balaguer | 290/43 |
| 3,812,379 A * | 5/1974 | Kaufman et al. | 290/50 |
| 4,010,377 A | 3/1977 | McKenzie | 290/1 R |
| 4,219,739 A | 8/1980 | Greenwell | 290/46 |
| 4,720,638 A | 1/1988 | Vollbrecht | 290/38 R |
| 4,873,962 A | 10/1989 | Safranek | 123/599 |
| 5,097,140 A | 3/1992 | Crall | 290/36 R |
| 5,132,604 A | 7/1992 | Shimane et al. | 322/10 |
| 5,261,842 A | 11/1993 | Hinkel, Jr. | 440/3 |
| 5,735,770 A * | 4/1998 | Omote et al. | 477/5 |
| 5,751,070 A | 5/1998 | Nagao et al. | 290/46 |
| 6,013,992 A * | 1/2000 | Ishikawa et al. | 318/376 |
| 6,018,198 A * | 1/2000 | Tsuzuki et al. | 290/17 |

\* cited by examiner

*Primary Examiner*—Nicholas Ponomarenko
(74) *Attorney, Agent, or Firm*—Russell E. Fowler, II; Jay G. Taylor; Ice Miller (57) ABSTRACT

A marine integrated starter alternator troller device (ISAT) includes a stator portion and a rotor portion connected to a drive shaft. The ISAT is incorporated into an engine assembly power train which includes an internal combustion engine having a crankshaft connected to an electric clutch. The electric clutch is operable to connect or disconnect the drive shaft and the crankshaft. Thus, the ISAT may be connected to or disconnected from the crankshaft of the internal combustion engine. When connected to the engine by the electric clutch, the ISAT device is operable to receive electrical power from a battery and act as a cranking motor to provide starting torque to the internal combustion engine. The ISAT may also be driven by the internal combustion engine and act as a generator to provide power to re-charge the battery or drive other electrical devices. When disconnected from the engine by the electric clutch, the ISAT receives electrical power from the battery and acts as a trolling motor to drive a propeller. A transmission is connected between the ISAT and the propeller such that rotation of the ISAT spins the propeller at a number of forward and reverse speeds.

20 Claims, 5 Drawing Sheets

INTEGRATED STARTER ALTERNATOR TROLLER

BACKGROUND OF THE INVENTION

This invention relates to the field of starter motors, and more particularly to starter motors for use with marine engines.

In internal combustion engines, the electro-mechanical functions of starting and power generation have traditionally been accomplished by separate discrete units. In particular, a cranking motor has been used for starting the engine, and a separate alternator has been used for generating electrical power from the work performed by the engine. With the advent of high power density per dollar inverters and low cost micro-controllers, integration of the starter motor and the alternator into a single unit has been practically achieved. Integrated starter motors and alternators vary in power output capability from low power starter-alternators to high power hybrid propulsion systems.

Marine engines are uniquely qualified for utilization of an electro-mechanical device that integrates the starter motor and the alternator. The marine application provides a more suitable environment for an integrated starter-alternator because of the lower cranking requirements, lower generating requirements, and an abundant source of water for cooling. Because of these factors, the control and power electronics used in marine integrated starter-alternators can be even more affordable than those used on automobile applications.

In addition to the electro-mechanical functions of starting and power generation, owners of marine engines often desire a separate electric motor application that is not required in any other industry. In particular, marine engine owners often desire a separate electric motor for "trolling," i.e., quietly propelling a boat through the water at a slow speed. Electric trolling motors are generally separate from the engine and are equipped with their own propellers. The most common use of the electric troller motor is for fishing. It may also be advantageous for boat owners to troll when leaving or entering the dock. Trolling is advantageous during this time to reduce emissions and avoid engine stall when traveling at low speeds around the dock.

If a fisherman desires to troll during his fishing trip, he must remember to bring along the trolling motor. Although the trolling motor may be stored on the boat, many boats do not have a safe place to store items such as trolling motors, and leaving the trolling motor on board when the boat is docked would invite theft of the trolling motor. Thus, most fisherman must carry their trolling motors to their boats before embarking on a fishing trip. Should a fisherman forget to bring his or her trolling motor when embarking on a fishing trip, he will not be able to troll during the trip.

In addition to remembering the trolling motor, the fisherman must also mount the trolling motor on the boat before it is used. Although mounting is usually a simple task, such as simply hooking the motor to the boat hull, it is nevertheless an inconvenience. Next, after the motor is mounted, it must be connected to the battery which provides electric power to the motor. After remembering to bring the motor and after properly mounting the motor and connecting it to the battery, the fisherman is finally ready to use the motor for trolling.

As discussed above, marine power applications generally require at least two and sometimes three separate electro-mechanical devices. Specifically, these devices are (1) cranking motors for starting, (2) alternators for power generation, and (3) trolling motors for slow and silent propulsion of the boat through the water. These discrete units take up a great deal of space in marine applications. Furthermore, the combined cost of each of these units is significant. Therefore, it would be advantageous if a single electro-mechanical device could be used to provide all three functions of starting, power generation, and trolling. Combining these units could save on a great deal of engine size and cost. Furthermore, integration of the starter-alternator of a marine engine with the trolling motor would provide the owner of the marine engine the opportunity to troll without having to remember a separate trolling motor when embarking on a fishing trip and without having to mount a separate motor to the boat.

For the foregoing reasons, there is a need for a single electro-mechanical device for use with an internal combustion marine engine that is operable to serve as a cranking motor for starting the engine, a generator for generating electrical power from the engine, and a trolling motor for providing quiet propulsion power when the engine is not in use.

SUMMARY OF THE INVENTION

The present invention is directed to a device that satisfies this need for combining the functions of starting, power generation, and electric propulsion in a single electro-mechanical device for a marine engine. The electro-mechanical device comprises three phase stator windings positioned across an air gap from a rotor winding. The rotor winding is fixed to the interior cup surface of a flywheel having a drive shaft extending through the center of the flywheel. The drive shaft is releasably connected at one end to a crankshaft of an internal combustion engine by an electric clutch. At another end, the drive shaft is connected to a transmission which drives a propeller.

The electro-mechanical device further comprises an active rectifier bridge having a plurality of transistor switches connected to the three phase stator windings. A controller is in communication with the active rectifier bridge and controls the active rectifier bridge such that the electro-mechanical device operates in one of several modes. In a first mode, the controller receives a starting mode command and operates the active rectifier bridge to cause the electro-mechanical device to act as a starting motor to crank the internal combustion engine. In a second mode, the controller senses that the engine has fired and automatically operates the active rectifier bridge to cause the electro-mechanical device to operate as a generator during operation of the internal combustion engine. In a third mode, the electric clutch disconnects the rotor drive shaft from the internal combustion engine crankshaft. At the same time, the controller receives an electric propulsion mode command and operates the active rectifier bridge to cause the electro-mechanical device to operate as an electric propulsion motor and provide propulsion power for the boat apart from the internal combustion engine.

These and other features, aspects and advantages of the present invention will become better understood with regard to the following description, appended claims, and accompanying drawings.

DETAILED DESCRIPTION

One embodiment of the present invention includes an electro-mechanical device 12 incorporated into an engine assembly power train. The electro-mechanical device is an induction machine which serves as an integrated starter, alternator and troller, referred to herein as the "ISAT." As show by the block diagram of FIG. 1, power train 10 includes an internal combustion marine engine 14, such as an outboard engine, having a crankshaft 16 connected to an electric clutch 18. The electric clutch 18 operates to either connect or disconnect the ISAT 12 from the engine 14. When connected to the engine by the electric clutch 18, the ISAT 12 is operable to receive electrical power from a battery 20 and act as a cranking motor to provide starting torque to the engine 14. The ISAT 12 may also be driven by the engine 14 and act as a generator to provide power to the battery or other electrical devices. When disconnected from the engine by the electric clutch 18, the ISAT receives electrical power from the battery and acts as a trolling motor to drive a propeller 24. A transmission 22 is connected between the ISAT 12 and the propeller 24 such that rotation of the ISAT spins the propeller at a number of forward and reverse speeds.

Figure 2:
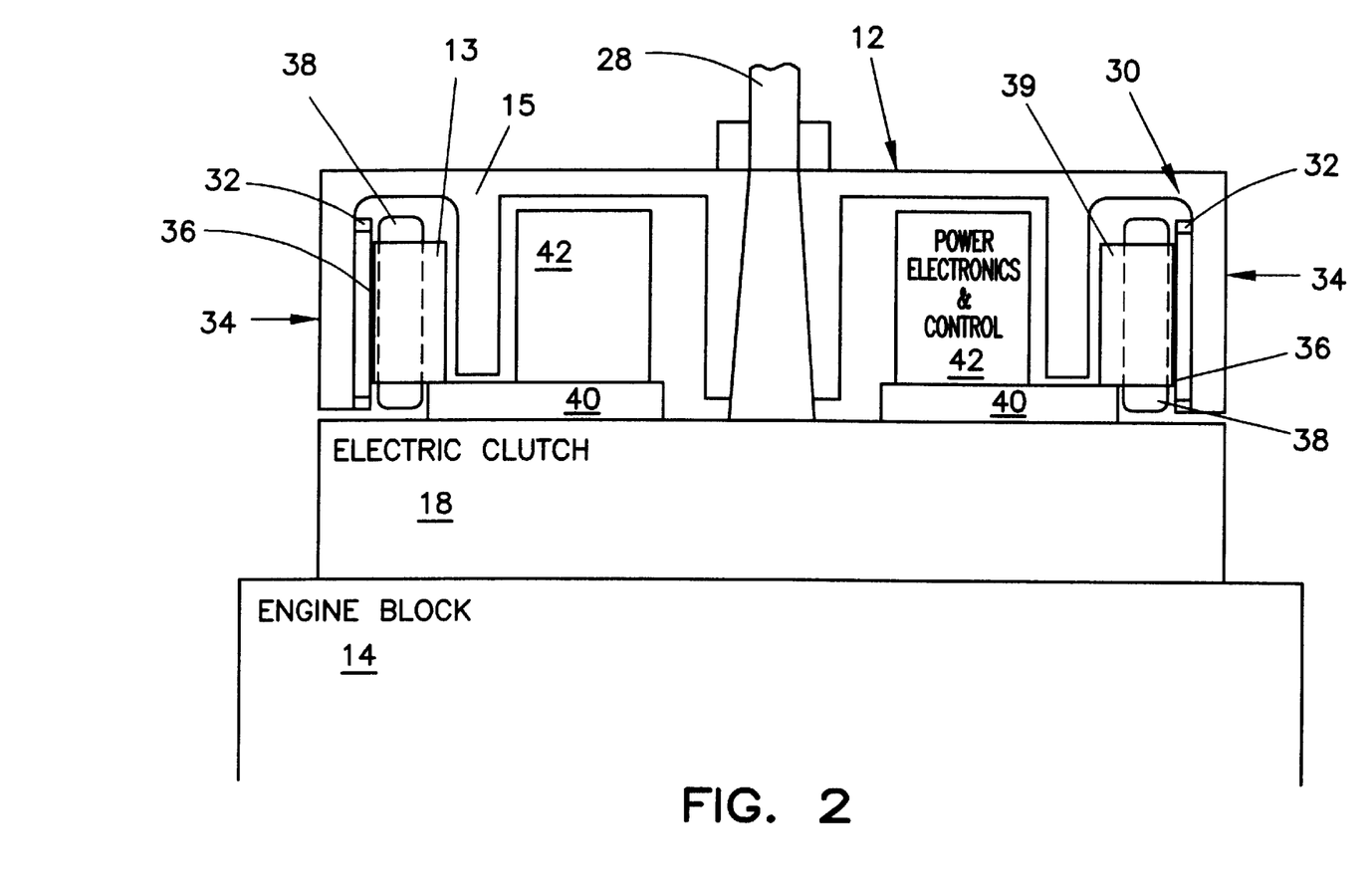
FIG. 2 is a cutaway view of a rotor and stator according to the integrated starter alternator troller of FIG. 1.
Figure 3:
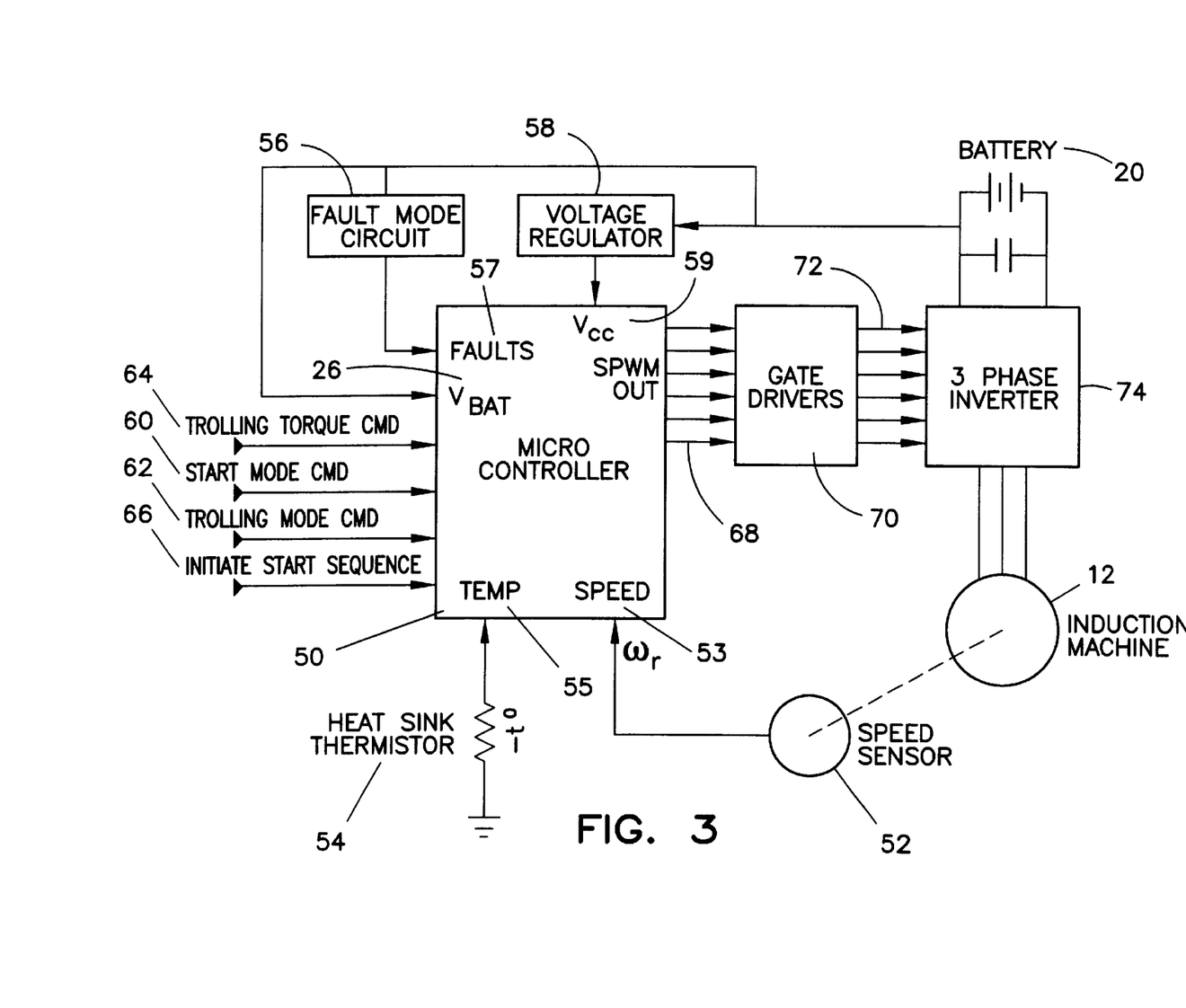
FIG. 3 is a block diagram showing implementation of the control electronics for the integrated starter alternator troller of FIG. 1.

As shown in FIG. 2, the ISAT 12 includes a stator portion 13 and a rotor portion 15. The rotor portion of the ISAT comprises an engine flywheel 30 located on the transmission side of the engine. The flywheel 30 is fixed to a drive shaft 28 which extends from the transmission 22, through the center of the flywheel 30, and into the electric clutch 18. The electric clutch 18 connects the drive shaft 28 to the crankshaft of the engine 14. The flywheel 30 serves as the rotor of an induction machine and includes a squirrel cage type winding 32 carried within the flywheel on an interior cup surface 34 of the flywheel 30. Concentrically located across a small air gap 36 from the rotor winding 32 are three phase stator windings 38. The stator windings 38 are held by stator laminations 39 which are stationary and fix mounted to the housing of the electric clutch 18 by a mounting plate 40. An electronics module 42 is fixed to the mounting plate 40 concentric with the stator windings 38. The electronics module 42 carries the power electronics and control circuitry for the ISAT device, including a microcontroller 50, gate drivers 70 and three phase inverter 74, as shown in FIG. 3. The microcontroller 50 controls the operations of the present invention based on the indirect vector control method, discussed in more detail herein. Cooling of the microprocessor and other elements in the electronics module 42 is greatly aided because the ISAT is intended for use with a marine engine 14, and an ample supply of water for cooling the electronics module 42 will be available during operation of the engine.

FIG. 3 is a block diagram showing implementation of the power electronics and control circuitry for the ISAT device. A number of inputs are used by the microcontroller 50 to determine various microcontroller outputs. The microcontroller 50 is connected to receive inputs from a command console (not shown) which instructs the microcontroller with a start mode command 60, a trolling mode command 62, a trolling torque command 64, and an initiate start sequence command 66. The command console allows a human operator to make these commands 60, 62, 64, and 66 by the flip of a switch, turn of a dial, press of a button, or any other suitable means. In one embodiment of the invention a mode switch on the command console toggles between the start mode command 60 and trolling mode command 62. The start mode command 60 instructs the microcontroller to operate in start mode such that the ISAT 12 acts as a cranking motor for starting the internal combustion engine. The trolling mode 62 command instructs the microcontroller to operate in a trolling mode such that the ISAT acts as a trolling motor when the internal combustion engine is not being used. A throttle device may be used on the command console for the trolling torque command 64 which instructs the microcontroller how fast to turn the propeller in the trolling mode. A simple push button or switch may be used on the command console for the initiate start sequence command 66 which instructs the microcontroller to begin operation of the ISAT as a cranking motor in the start mode.

In addition to the above inputs from the command console, the microcontroller 50 is further connected to receive system inputs from a speed sensor 52, a heat sink thermistor 54, a fault mode circuit 56, a voltage regulator 58, and the battery 20. The speed sensor 52 determines the rotor 15 rpms and delivers this value to the microcontroller at "speed" input 53. The microcontroller uses this speed as an important factor for controlling the operation of the ISAT, as discussed in more detail herein. The heat sink thermistor 54 monitors the temperature of the ISAT unit and delivers the temperature to the microcontroller at "temp" input 55. If the microcontroller 50 determines that the temperature of the ISAT is too high, the microcontroller will shut down the ISAT until the machine cools down to an allowable temperature. The fault mode circuit compares the actual voltage across the battery 20 terminals to an allowable range of voltages. If the voltage across the battery is too low, the fault mode circuit reports a fault signal to the microcontroller at "faults" input 57. This fault signal will generally be reported to the microcontroller in the trolling mode after extended operation of the ISAT as a trolling motor. In this situation, the microcontroller may discontinue the trolling operation when the fault mode circuit senses that the battery voltage has reached a predetermined lower threshold. The voltage regulator is connected across the battery terminals and operates to provide a steady voltage supply to the microcontroller at "Vcc" input 59. In addition, the actual battery voltage is presented to the microprocessor at a "Vbat" input 26. This actual battery voltage is used by the microprocessor as an important factor for controlling the operation of the ISAT, as discussed in more detail below.

Depending upon the inputs received, the microcontroller 50 outputs six sinusoidal pulse width modulation (SPWM) signals 68 at the "SPWM Out" output 69. The SPWM signals 68 control the operations of gate drivers 70. The gate drivers 70, in turn, control transistor switches 72 of a three phase inverter 74, as is standard in the art, such as the inverter shown in FIG. 4. The three phase inverter 74 is connected to the battery 20, gate drivers 70, and stator windings 38. The transistor switches of the three phase inverter are generally MOSFET switches having body diodes. The three phase inverter 74 with MOSFET switches 72 is also know as an "active rectifier bridge" because the MOSFET switches may be turned on and off to determine current flow within the three phase inverter. The ability to control the MOSFET switches 72 in the three phase inverter 74 allows the microcontroller 50, through gate drivers 70, to control the currents through the stator windings and the voltages output from the three phase inverter 74 and thereby efficiently operate the invention as a starter motor, generator, or trolling motor. For example, when the ISAT is operated as a cranking or trolling motor, the microcontroller controls the currents through the stator windings such that the average current through the stator windings is defined in the positive direction. When the ISAT is operated as a generator, the microcontroller controls the currents through the stator windings such that the average current through the stator windings is defined in the negative direction. As another example, when the ISAT is used as a cranking motor, the microcontroller controls the currents through the stator windings to achieve a single optimal rotor cranking speed. However, when the ISAT is used as a trolling motor, the microcontroller controls the currents through the stator windings depending upon any of several requested rotor speeds used during trolling.

ISAT Control

In order to accomplish the above objectives of using the ISAT as a starting motor, generator, and trolling motor, the microprocessor 50 uses the Indirect Vector Control Method to control ISAT operations. The Indirect Vector Control Method is a way of independently controlling the flux and torque produced by an induction machine such as the ISAT. Induction machines are singly excited machines where electrical power is only applied to the field (stator) windings 38. The current in the armature (rotor) winding is induced based upon the current flowing through the field windings. Thus, the only direct control over the induction machine is obtained by controlling the current fed through the stator windings 38, as there is no independent control over the current in the armature windings. Because only the field current is directly controlled in an induction machine, it is difficult to control the overall efficiency of the machine. The indirect vector control method provides a manner of efficiently controlling an induction machine by commanding particular current amounts though the field windings.

According to the indirect vector control method, an induction machine may be controlled by splitting the stator current of an induction machine into a flux component and a torque component of stator current. This allows the machine to be controlled similar to the manner in which a DC machine may be controlled. In a DC machine, independent control exists for the field current (i.e., the current through the field winding that produces magnetic flux rotation or "flux") and the armature current (i.e., the current through the armature winding that produces the EMF or "torque"). By adjusting these two currents in a DC machine, the flux and torque of the machine can be controlled to thereby control the efficiency of the drive. Similarly, with the indirect vector control method, the stator current of an induction machine is divided into two components: a flux component of stator current, $i_{ds}^*$, and a torque component of stator current, $i_{qs}^*$. (As used herein, a "*" attached to a particular variable indicates that the variable is a component commanded by the microcontroller, and not an actual value.) These two components of stator current, $i_{ds}^*$ and $i_{qs}^*$, represent independent control over the flux and torque of an induction machine. Thus, the flux component and torque components of stator current may be manipulated to thereby control the efficiency of the drive in the induction machine. The manipulated flux and torque components of stator current are then transformed into three separate current values which are respectively commanded in each of the stator windings 38 by controlling the three phase inverter 74.

Figure 5:
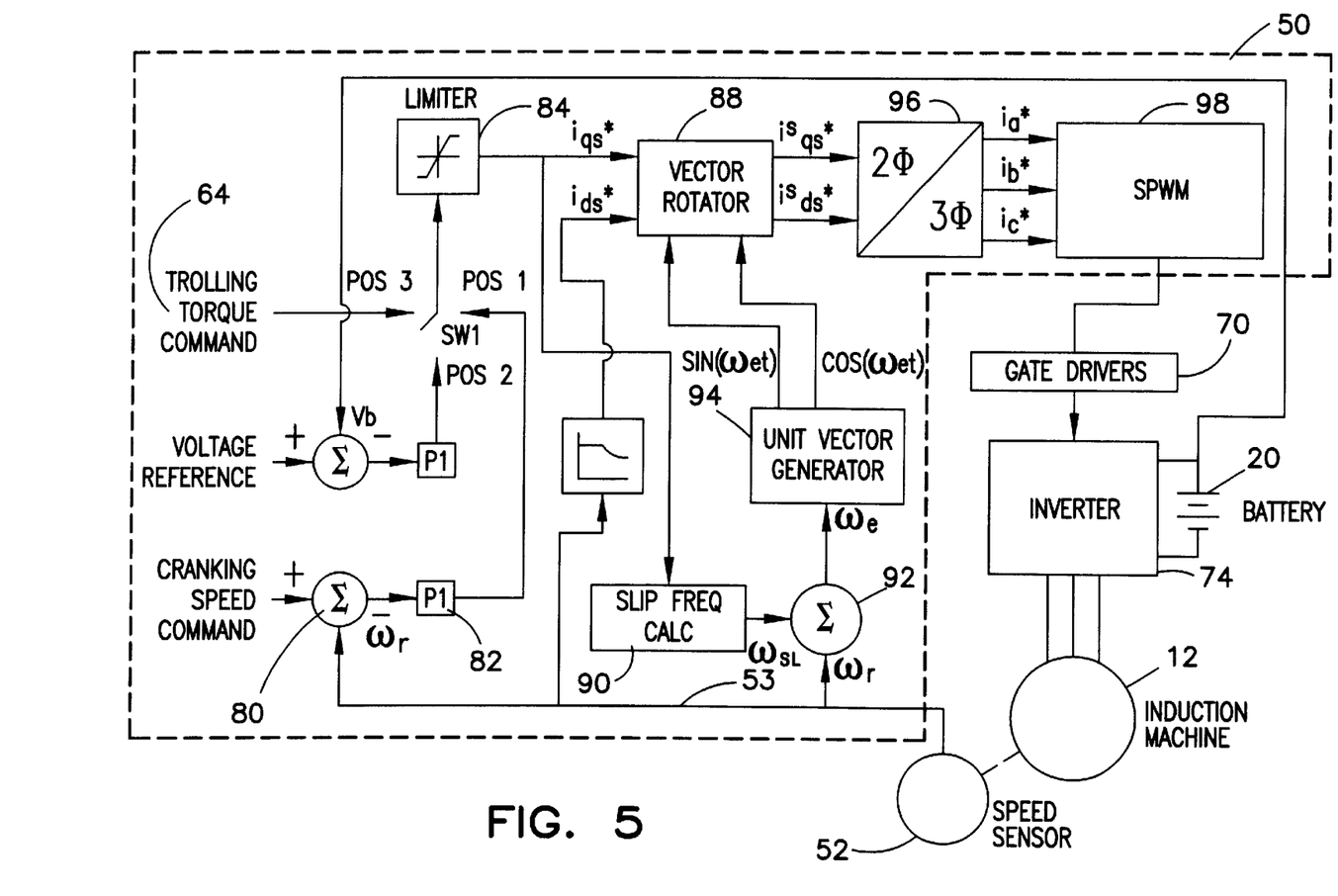
FIG. 5 is a block diagram showing the control method for the integrated starter alternator troller of FIG. 1.

FIG. 5 shows a block diagram of a method of controlling the ISAT 12 using the indirect vector control method. All blocks in FIG. 5 within the dotted lines represent processes and calculations occurring within the microprocessor 50. The boxes outside of the dotted lines represent physical structures which receive output signals from the microprocessor 50 or provide inputs to the microprocessor. Inputs to the microprocessor include the trolling torque command 64, a voltage reference, a cranking speed command, the battery voltage 26, and the rotor speed input 53. Microprocessor 50 outputs include the six SPWM signals 68 that control the gate drivers 70.

As shown in FIG. 5, the microcontroller is placed in one of three modes as represented by switch SW1. The position of switch SW1 is dependent upon inputs received by the microcontroller such as the start mode command 60 or trolling mode command 62. When the switch SW1 is in the first position, POS1, the ISAT will be operated as a starting motor. When the switch SW1 is in the second position, POS2, the ISAT will be operated as a generator. When the switch SW1 is in the third position, POS3, the ISAT will be operated as a trolling motor.

When the ISAT device 12 is to be operated as the starter of the internal combustion engine 14, i.e., upon receipt by the microcontroller of the start mode command 60 and initiate start sequence command 66, switch SW1 is placed in position 1 and the microcontroller 50 commands operation of the ISAT device 12 as a starter motor. To this end, as shown in FIG. 5, the microcontroller 50 begins by subtracting the actual rotor speed from the desired cranking speed at first summation block 80, which provides a closed loop cranking speed control loop. First summation block 80 then provides the difference between the desired cranking speed and the actual cranking speed to a first proportional integral controller (the "first PI controller") 82 as an error amount. Based on this error, the first PI controller 82 commands a particular torque component of stator current, $i_{qs}^*$, which will result in the most efficient operation of the ISAT. Typically, the greater the error, the greater the commanded torque component of stator current by the first PI controller 82. However, this commanded torque component of current is limited to a maximum value by a limiter 84, which prevents commands for excessive amounts of the torque component of stator current when the error delivered the PI controller 82 is excessive. For example, when first starting the motor, the rotor speed will be zero and a large error will be seen by the first PI controller 82. Thus, to prevent an excessive request for the torque component of stator current, the limiter 84 places a cap on the maximum torque component of stator current that may be commanded. After passing through the limiter, the torque component of stator current, $i_{qs}^*$, is delivered to a vector rotator 88.

Simultaneous with commanding the torque component of stator current, $i_{qs}^*$, the microprocessor 50 also commands the flux component of stator current, $i_{ds}^*$. When maximum power is desired from an induction machine, an optimal flux level exists for a given amount of rotor speed. Accordingly, the flux component of stator current is commanded by a pre-programmed look-up table in the microprocessor, as indicated in table look-up block 86. Thus, the flux component of stator current, $i_{ds}^*$, is a simple function of the speed of the rotor. This commanded flux component of stator current, $i_{ds}^*$, is then delivered to the vector rotator 88, along with the commanded torque component of stator current, $i_{qs}^*$.

The vector rotator 88 transforms the $i_{ds}^*$ and $i_{qs}^*$ currents from the synchronous reference frame to the stationary reference frame. The following equations define this transformation:

$$i^s_{ds}{}^* = i_{ds}{}^*\cos(\omega_e t) - i_{qs}{}^*\sin(\omega_e t)$$

$$i^s_{qs}{}^* = i_{ds}{}^*\sin(\omega_e t) - i_{qs}{}^*\cos(\omega_e t)$$

where $i^s_{ds}{}^*$ is the flux component of stator current in the stationary reference frame and $i^s_{qs}{}^*$ is the torque component of stator current in the stationary reference frame.

Figure 4:
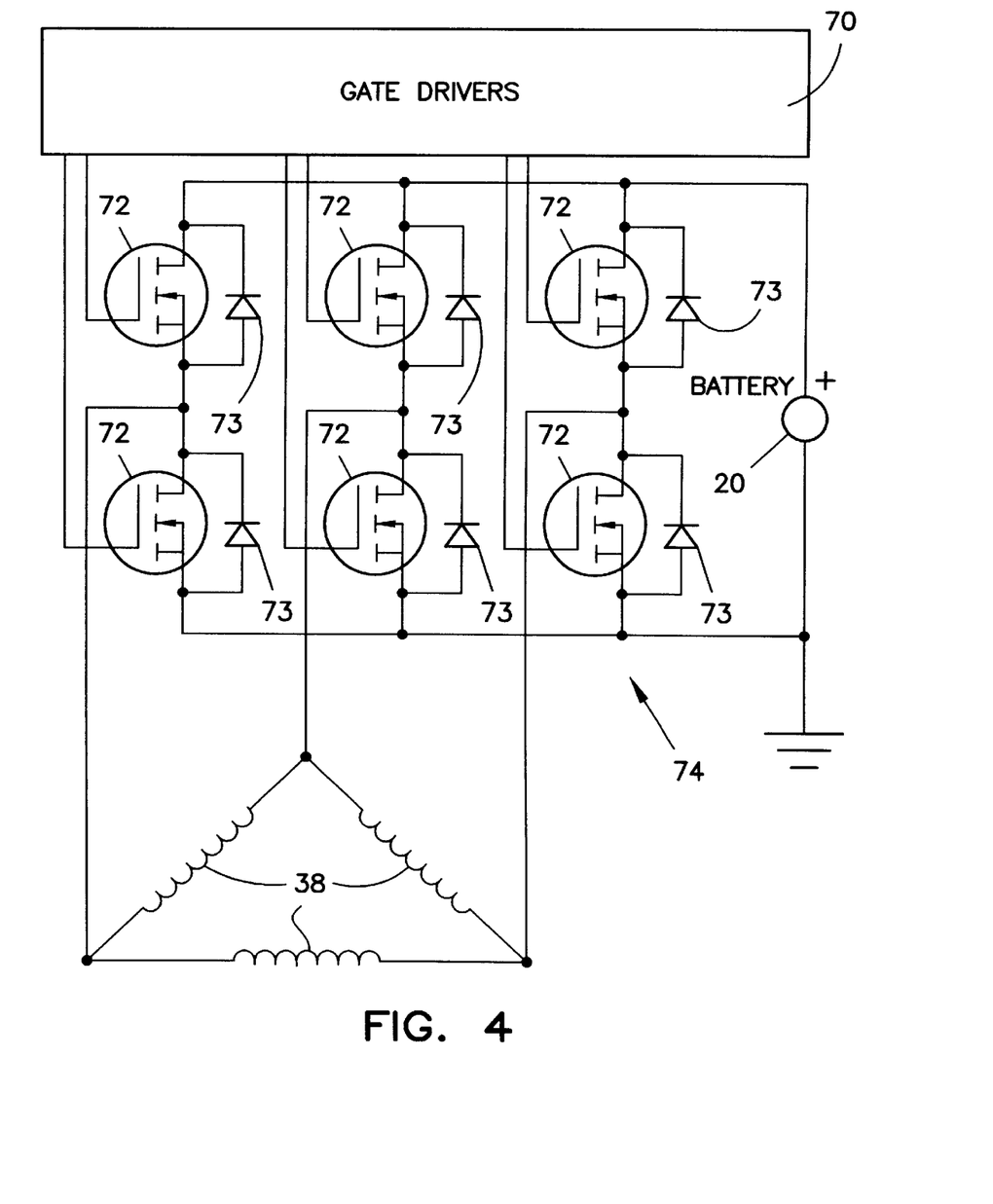
FIG. 4 is a circuit layout for the three phase inverter shown in FIG. 3.

As shown by the above equations, and in FIG. 4, values for $\cos(\omega_e t)$ and $\sin(\omega_e t)$ are used by the vector rotator to make the transformation from the synchronous reference frame to the stationary reference frame. These values are calculated as shown in the slip frequency calculation block 90, the stator summation block 92, and unit vector generator 94. The slip frequency, $\omega_{sl}$, is directly proportional to the torque component of stator current. Slip frequency calculation block 90 first provides a value for the slip frequency, $\omega_{sl}$, according to the following equations:

$$\omega_{sl} = i_{qs}{}^* K$$

where K=slip gain constant=$(L_m R_r)/(L_r/\psi_r/)$
and $L_m$=mutual inductance
$R_r$=Rotor resistance
$L_r$=Rotor inductance
$/\psi_r/$=Magnitude of rotor flux After calculating the slip frequency, $\omega_{sl}$, summation block 92 adds the slip frequency to the rotor frequency, $\omega_r$, to produce the stator frequency, $\omega_e$. In other words, $$\omega_e = \omega_r$$

After calculating the stator frequency, $\omega_e$, the unit vector generator 94 uses the stator frequency to calculate values for $\sin(\omega_e(t))$ and $\cos(\omega_e(t))$, and delivers these values to the vector rotator for transformation of the $i_{ds}{}^*$ and $i_{qs}{}^*$ currents from the synchronous reference frame to the stationary reference frame, as described above in conjunction with vector rotator block 88.

The output of the vector rotator 88 results in a commanded value for the torque component of stator current in the stationary reference frame, $i^s_{qs}{}^*$, and a commanded value for the flux component of stator current in the stationary reference frame, $i^s_{ds}{}^*$. These stationary reference frame values are then transformed into commanded three phase currents for the stator windings in 2 phase/3 phase box 96. This box transforms the stationary reference frame values from two-phase flux and torque quantities to three phase stator current quantities according to the following two-phase to three-phase equations:

$$i_a{}^* = i^s_{qs}{}^*$$

$$i_b{}^* = -(\sqrt{3}/2)i^s_{ds}{}^* - (\tfrac{1}{2})i^s_{qs}{}^*$$

$$i_c{}^* = -(\sqrt{3}/2)i^s_{ds}{}^* - (\tfrac{1}{2})i^s_{qs}{}^*$$

These commanded currents, $i_a{}^*$, $i_b{}^*$, and $i_c{}^*$, are delivered to SPWM box 98 where pulses are generated and fed to gate drivers 70, causing the gate drivers to control the three phase inverter 74 to result in the currents $i_a$, $i_b$, and $i_c$ in each respective phase of the stator windings 38. Of course, these currents will continually change with time and with changing conditions of the induction machine, but the method of controlling the induction machine will result in improved efficiency of the ISAT device when it operates as a cranking motor.

When the ISAT device is to be operated as a generator, i.e., after the engine 14 has fired, switch SW1 is placed in position 2 and the microcontroller 50 begins operation of the ISAT device 12 as a generator. With the switch in position 2, the torque component of stator current is commanded based on the difference between a reference of the desired voltage and the actual voltage across the battery terminals. This difference is fed to a second PI controller 83 which commands a particular torque component of stator current, $i_{qs}{}^*$. Typically, the greater the difference between the desired voltage and the actual voltage, the greater the torque component of stator current that will be commanded from the second PI controller 83. As with the previously described operation of the ISAT as a starting motor, the limiter 84 prevents commands for excessive amounts of the torque component of stator current when the difference between the desired and actual voltage is large. At the same time, microcontroller 50 determines a value for the flux component of stator current, $i_{ds}{}^*$, based on the speed of the rotor. The microcontroller takes these torque and flux components of stator current and eventually transforms them into commanded currents $i_a{}^*$, $i_b{}^*$, and $i_c{}^*$ in the same manner as described above for operation of the ISAT as a starter motor. Again, the commanded currents, $i_a{}^*$, $i_b{}^*$, and $i_c{}^*$, are delivered to SPWM box 98 where pulses representative of the currents are generated and fed to gate drivers 70, causing the gate drivers to control the three phase inverter 74 to result in the currents $i_a$, $i_b$, and $i_c$ in each respective phase of the stator windings 38. Of course, these currents will continually change with time and with changing conditions of the induction machine, but the method of controlling the induction machine will result in improved efficiency of the ISAT device when it operates as a generator.

When the ISAT device is to be operated as a trolling motor, i.e., upon receipt by the microcontroller of the trolling mode command, switch SW1 is placed in position 3 and the microcontroller 50 begins operation of the ISAT device 12 as a trolling motor. With the switch in position 3, the torque component of stator current, $i_{qs}{}^*$, is commanded directly from the trolling torque command 64, which is made from the command console via an adjustable voltage input. As with the previously described operation of the ISAT as a starting motor or generator, when operating the device as a trolling motor the microcontroller determines a value for the flux component of stator current, $i_{ds}{}^*$, based on the speed of the rotor. The microcontroller takes these torque and flux components of stator current and eventually transforms them into commanded currents $i_a{}^*$, $i_b{}^*$, and $i_c{}^*$ in the same manner as described above for operation of the ISAT as a starter motor or generator. Again, the commanded currents, $i_a{}^*$, $i_b{}^*$, and $i_c{}^*$, are delivered to SPWM box 98 where pulses are generated representative of the currents and fed to gate drivers 70, causing the gate drivers to control the three phase inverter 74 to result in the currents $i_a$, $i_b$, and $i_c$ in each respective phase of the stator windings 38. Of course, these currents will continually change with time and with changing conditions of the induction machine, but the method of controlling the induction machine will result in improved efficiency of the ISAT device when it operates as a trolling motor.

In summary of the above method of control, it should be realized that the flux component of stator current, $i_{ds}{}^*$, is always dependent only on the speed of the rotor. One the other hand, the torque component of stator current, $i_{qs}{}^*$, is dependent upon the mode of operation of the ISAT 12. First, if the ISAT operates as a cranking motor, $i_{qs}{}^*$ is a function of the difference between the optimal cranking speed and the actual cranking speed of the rotor. Second, if the ISAT operates as a generator, $i_{qs}{}^*$ is a function of the difference between a desired voltage level and the actual voltage across the battery terminals. Third, if the ISAT operates as a trolling motor, $i_{qs}^*$ is directly related to the trolling torque command 64. After commanding a particular flux component of stator current and torque component of stator current, the indirect vector control method manipulates each of these components to command a particular current in each phase of the three phase stator windings 38. The gate drivers 70 and inverter 74 are then controlled by the microprocessor to result in the commanded currents in each phase of the stator windings 38. Thus, the indirect vector control method provides for efficient operation of the ISAT as a starter motor, generator, or trolling motor.

ISAT Operation

Figure 1:
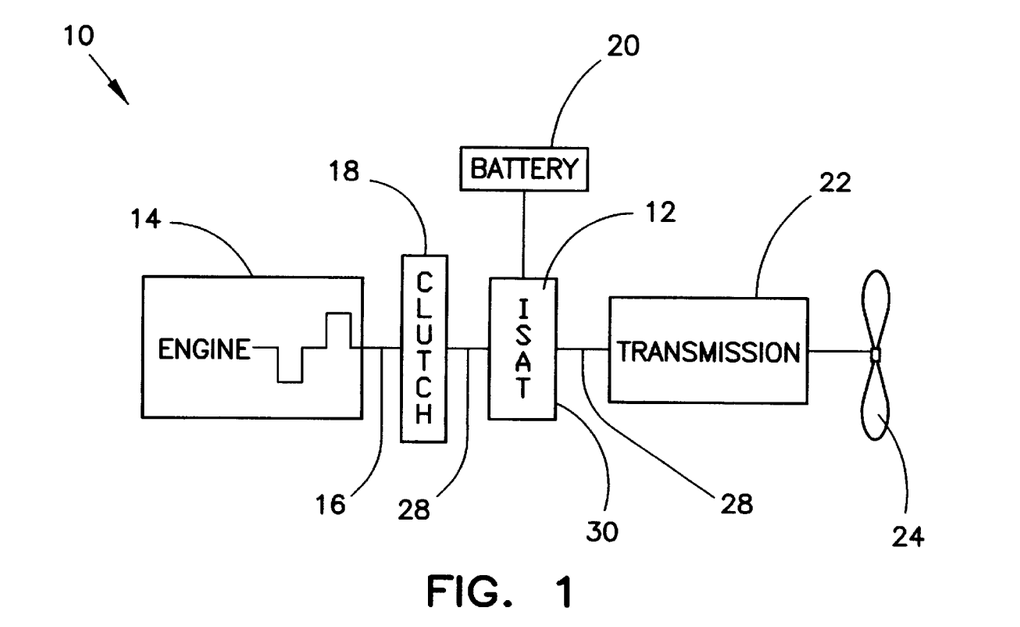
FIG. 1 is a block diagram of an engine arrangement including an integrated starter alternator troller.

Operation of the ISAT 12 device will now be explained with general reference to each of FIGS. 1–3. The ISAT 12 device is set into operation by a human operator at the command console (not shown). The operator first flips a toggle switch to indicate whether he or she wishes to operate the ISAT as a starter motor or trolling motor. If the toggle switch is flipped for use of the ISAT as a starter motor, the start mode command 60 is delivered to the microprocessor 50, and the electric clutch connects the drive shaft 78 to the engine crankshaft. Before the microcontroller begins operation of the ISAT as a starter motor, the operator must press a button to deliver the initiate start sequence command 66 to the microcontroller. Upon receipt of the initiate start sequence command 66 from the operator, the microcontroller begins operation of the ISAT device to turn the rotor 15 and connected drive shaft 28. Rotation of the drive shaft 28 causes rotation of the crankshaft and cranks the engine 14. Once cranking starts, the microcontroller 50 monitors the total cranking time, and halts cranking of the engine if the engine has not fired after a pre-set period of time to prevent overcranking of the engine 14. If cranking is halted because the pre-set period of time has elapsed, the microcontroller 50 will not allow further cranking of the engine until a pre-set cool down period passes.

Upon firing of the engine 14, the crankshaft 16 will begin to spin at an increased speed. As the crankshaft 16 spins at an increased speed, the drive shaft 28 will also spin at an increased speed because the drive shaft remains linked to the crankshaft through the electric clutch 18. The rotor speed sensor 52 monitors the speed of the rotor 15 and provides a signal to the microcontroller 50 indicative of the speed of the rotor 15. When the speed of the rotor passes a threshold speed, the microcontroller determines that the engine has fired, and automatically switches operation of the ISAT device 12 from that of a cranking motor to that of a generator. This action by the microcontroller 50 prevents any overcranking or disengagement problems that sometimes arise with traditional starter motors.

When operating the ISAT as a generator, the microcontroller 50 controls the current through the stator windings 38 and inverter 74 such that electrical energy is provided across the battery 20 terminals to power on board electrical loads and re-charge the battery. In addition, microcontroller 50 monitors the voltage across the battery 20 terminals and increases or decreases the amount of current through the stator windings, depending upon whether more voltage or less voltage is required across the battery terminals. If the microcontroller 50 senses that the ISAT is overheating, the microcontroller will limit the current through stator windings 38 in an attempt to cool the ISAT device, or shut down the ISAT device to prevent any damage to the device.

When the operator wishes to operate the ISAT 12 as a trolling motor, the operator generally stops the engine and flips the toggle switch from the start mode command to the trolling mode command. The trolling mode command also instructs the electric clutch 18 to decouple the drive shaft 28 of the ISAT 12 from the crankshaft 16 of the engine 14. Next, the operator delivers the trolling torque command 64 to the microcontroller causing the rotor 15 of the ISAT to spin at any number of forward or reverse speeds. With the engine removed from the power train 10, the rotor 15 spins without cranking the engine 14. As the rotor 15 spins, the propeller 24 also spins. The speed of the propeller may be controlled by the operator by adjusting the user operated throttle control. The user operated throttle control is generally located on the command console and delivers the trolling torque command 64 to the microcontroller to control the speed of the rotor 15 as well as the propeller which is linked to the rotor by transmission 22 and drive shaft 28.

After extended use of the ISAT 12 as a trolling motor, much of the power from the battery 20 will be drained. Thus, the microcontroller 50 monitors this voltage with fault mode circuit 56, as shown in FIG. 3, and fault mode circuit provides a fault signal to the microcontroller when the battery voltage reaches a pre-determined threshold. After receiving a fault signal, the microcontroller activates a visual or audible warning device (not shown) to provide the operator with a warning that the battery voltage is low. This warning signals the user to discontinue use of the invention as a trolling motor so that adequate energy will be available in the battery to operate the ISAT as a starter when the operator wants to re-start the engine and drive the boat at normal speeds. If the operator continues use of the ISAT as a trolling motor for a predetermined amount of time after receipt of a warning signal, the microcontroller may prevent further use of the device as a trolling motor until the battery is sufficiently recharged.

After trolling for a time, the operator may restart the engine by manipulating the command console to deliver the start mode command 60 and the initiate start sequence command 66 to the microcontroller. Upon receipt of the start mode command, the electric clutch 18 re-couples the engine crankshaft to the drive shaft 28 of the ISAT. After receiving the initiate start sequence command 66, the microcontroller outputs six SPWM signals 68 to the gate drivers 70, which control the switches of the three phase invertor 74. The three phase inverter 74 allows current to flow through the stator windings 38 and the device acts as a starting motor to crank the engine. Again, once the engine 14 is restarted, the ISAT switches to a generator mode. In the generator mode, energy depleted from the battery during use of the invention as a trolling motor is replenished and other electrical loads are driven by the generated power.

Although the present invention has been described with reference to certain preferred embodiments thereof, one of ordinary skill in the art will recognize that the above embodiments of the invention are not the only possible embodiments. For example, the ISAT may include an independent housing rather than being contained within the flywheel. Additionally, a mechanical clutch device could be used instead of an electric clutch to disconnect the drive shaft from the engine crankshaft. Another example is that use of the ISAT is not limited to outboard engines, and the ISAT could also be used in conjunction with other engines such as inboard or stern drive engines. Furthermore, any number of command console arrangements are possible for delivering commands to the microcontroller. Also, the ISAT need not be an induction machine, as the ISAT could be any number of other motor types such as a permanent magnet motor or a switched reluctance motor. Depending upon the motor used, different control algorithms may be used on the motor including scalar control methods and field oriented control methods. Additionally different command combinations may be used for delivery to the microcontroller for placing the microcontroller in the starting, generating or trolling modes. In particular, the initiate start sequence command could be eliminated such that the microcontroller automatically operates the ISAT as a starter motor when the start mode command is received. In another embodiment of the invention, a larger capacity drive system could be used to deliver power to the ISAT to create a hybrid propulsion system. In such a hybrid system, the ISAT could provide pure electric propulsion power above normal trolling speeds or could boost engine performance by augmenting the engine output with the electric motor output. A supplemental output by the electric motor could greatly improve fuel economy and engine emissions. This could become an increasingly more important feature due to the heightened attention given recently to marine engine pollutant emissions. Therefore, the spirit and scope of the appended claims should not be limited to the description of the embodiments contained herein.

What is claimed is:

1. A propulsion system for a boat comprising:
   a. an electro-mechanical device operable as an electric motor or an electric generator, the electro-mechanical device having a rotor connected to a drive shaft;
   b. an internal combustion engine having a rotatable crankshaft releasably connected to the drive shaft;
   c. a clutch in communication with the drive shaft and the crankshaft, the clutch for releasably connecting the drive shaft to the crankshaft and disconnecting the drive shaft from the crankshaft;
   d. a propeller operable to rotate when driven by rotation of the rotor and the drive shaft; and
   e. a controller operable to control the electric currents flowing in the electro-mechanical device and thereby cause the electro-mechanical device to operate as (i) a generator when the internal combustion engine is running, (ii) a starter motor that provides power to crank the internal combustion engine when the internal combustion engine is not running, or (iii) a trolling motor that provides power to rotate the drive shaft and the rotor.

2. The system of claim 1 wherein the clutch is an electric clutch.

3. The system of claim 1 wherein the electro-mechanical device comprises a rotor winding positioned upon the rotor and three phase stator windings positioned across an air gap from the rotor winding, the three phase stator windings connected to an active rectifier bridge, the active rectifier bridge being controlled by gate drivers and the gate drivers being controlled by the controller.

4. The system of claim 3 wherein the controller is operable to receive a start mode command for instructing the controller to operate the electro-mechanical device as a cranking motor.

5. The system of claim 4 wherein the controller is operable to receive a signal representing the speed of the rotor, such that when the rotor achieves a speed indicating that the internal combustion engine has fired, the controller operates the electro-mechanical device as a generator.

6. The system of claim 3 wherein the controller is operable to receive a electric propulsion mode command for instructing the controller to operate the electro-mechanical device as a motor to provide propulsion power for the boat.

7. The system of claim 6 wherein the electric propulsion mode command instructs the clutch to disconnect the crankshaft from the drive shaft.

8. The system of claim 3 wherein the controller uses an indirect vector control method to control the active rectifier bridge, the indirect vector control method comprising the steps of
   a. determining a torque component of stator current;
   b. determining a flux component of stator current;
   c. transferring the torque component of stator current and the flux component of stator current from a synchronous reference frame to a stationary reference frame using vector rotation equations; and
   d. transferring the torque component of stator current and the flux component of stator current in the stationary reference frame from two-phase flux and torque quantities to three-phase stator current quantities using two-phase to three-phase equations.

9. An electro-mechanical device for use with an internal combustion engine having a crankshaft, the electro-mechanical device comprising:
   a. three phase stator windings;
   b. a rotor having a rotor winding positioned across an air gap from the stator windings, the rotor having a drive shaft releasably connected to the crankshaft;
   c. an active rectifier bridge connected to the three phase stator windings, the active rectifier bridge comprising a plurality of transistor switches;
   d. a controller in communication with the active rectifier bridge, the controller operable to control the active rectifier bridge such that the electro-mechanical device operates in one of at least three modes, wherein
      i. a first of the at least three modes causes the electro-mechanical device to operate as a starting motor to crank the internal combustion engine when the internal combustion engine is not in operation,
      ii a second of the at least three modes causes the electro-mechanical device to operate as a generator during operation of the internal combustion engine, and
      iii a third of the at least three modes causes the electro-mechanical device to operate as an electric motor to provide propulsion power for the boat.

10. The electro-mechanical device of claim 9 wherein the controller is connected to gate drivers which are connected to the active rectifier bridge, the controller controlling the active rectifier bridge by controlling the gate drivers.

11. The electro-mechanical device of claim 9 wherein the controller receives a start mode command from a command console instructing the controller to operate in the first of the at least three modes.

12. The electro-mechanical device of claim 11 wherein the controller begins operation in the first of the at least three modes upon receipt of an initiate start sequence command.

13. The electro-mechanical device of claim 9 wherein the controller receives a signal representative of rotor speed from a speed sensor and the controller operates in the second of the at least three modes when the rotor speed reaches a threshold indicating that the internal combustion engine has fired.

14. The electro-mechanical device of claim 9 wherein the controller receives an electric propulsion mode command from a command console instructing the controller to operate in the third of the at least three modes.

15. The electro-mechanical device of claim 14 wherein the drive shaft is disconnected from the crankshaft when the controller receives the electric propulsion mode command.

16. The electro-mechanical device of claim 9 wherein the controller uses an indirect vector control method to operate the electro-mechanical device in one of the at least three modes, the indirect vector control method comprising the steps of
   a. determining a torque component of stator current;
   b. determining a flux component of stator current;
   c. transferring the torque component of stator current and the flux component of stator current from a synchronous reference frame to a stationary reference frame using vector rotation equations; and
   d. transferring the torque component of stator current and the flux component of stator current in the stationary reference frame from two-phase flux and torque quantities to three-phase stator current quantities using two-phase to three-phase equations.

17. A method of operating an electro-mechanical device having a rotor and an active rectifier bridge, the active rectifier bridge electrically connected to a battery and a controller, the rotor releasably connected to an internal combustion engine, the rotor also connected to a propeller, the method comprising the steps of:
   a. sending a first signal to the controller to operate the electro-mechanical device as a starting motor and, upon receipt of the first signal by the controller, controlling the active rectifier bridge such that the electro-mechanical device operates as a starting motor to crank the internal combustion engine;
   b. sending a second signal to the controller to operate the electro-mechanical device as a generator, and upon receipt of the second signal by the controller, controlling the active rectifier bridge such that the electro-mechanical device operates as a generator driven by the internal combustion engine; and
   c. sending a third signal to the controller to operate the electro-mechanical device as an electric motor, and upon receipt of the third signal by the controller, controlling the active rectifier bridge such that the electro-mechanical device operates as a propulsion motor.

18. The method of claim 17 further comprising the step of disconnecting the electro-mechanical device from the internal combustion engine when the third signal is sent to the controller.

19. The method of claim 18 wherein the controller activates a warning device when the battery voltage reaches a predetermined threshold during operation of the electro-mechanical device as the trolling motor.

20. The method of claim 17 wherein the controller uses an indirect vector control method to control the active rectifier bridge, the indirect vector control method comprising the steps of
   a. determining a torque component of stator current;
   b. determining a flux component of stator current;
   c. transferring the torque component of stator current and the flux component of stator current from a synchronous reference frame to a stationary reference frame using vector rotation equations; and
   d. transferring the torque component of stator current and the flux component of stator current in the stationary reference frame from two-phase flux and torque quantities to three-phase stator current quantities using two-phase to three-phase equations.

* * * * *